United States Patent
Vazquez et al.

(10) Patent No.: US 8,942,260 B2
(45) Date of Patent: Jan. 27, 2015

(54) SERVICES, SYSTEMS AND METHODS FOR PRECISELY ESTIMATING A DELAY WITHIN A NETWORK

(71) Applicant: Marvell World Trade Ltd., St. Michael (BB)

(72) Inventors: Marcos Martinez Vazquez, Barcelona (ES); Diego Arlandis Malonda, Valencia (ES)

(73) Assignee: Marvell World Trade Ltd., St. Michael (BB)

( * ) Notice: Subject to any disclaimer, the term of this patent is extended or adjusted under 35 U.S.C. 154(b) by 68 days.

(21) Appl. No.: 13/664,884

(22) Filed: Oct. 31, 2012

(65) Prior Publication Data
US 2013/0107896 A1 May 2, 2013

Related U.S. Application Data

(60) Provisional application No. 61/554,884, filed on Nov. 2, 2011.

(51) Int. Cl.
*H04W 4/00* (2009.01)
*H04J 3/06* (2006.01)

(52) U.S. Cl.
CPC ............ *H04J 3/0682* (2013.01); *H04J 3/0658* (2013.01)
USPC ......................................................... 370/503

(58) Field of Classification Search
CPC ....... H04J 3/065; H04J 3/0635; H04J 3/0682; H04L 43/0858
See application file for complete search history.

(56) References Cited

U.S. PATENT DOCUMENTS

| | | | |
|---|---|---|---|
| 2002/0024973 A1* | 2/2002 | Tavana et al. | 370/508 |
| 2006/0240770 A1 | 10/2006 | Shima et al. | |
| 2007/0008993 A1 | 1/2007 | Cha et al. | |
| 2008/0130687 A1 | 6/2008 | Ha et al. | |
| 2010/0220629 A1* | 9/2010 | Chang et al. | 370/252 |
| 2011/0216816 A1* | 9/2011 | Frenzel | 375/222 |
| 2012/0099432 A1* | 4/2012 | Bercovich et al. | 370/235 |

FOREIGN PATENT DOCUMENTS

EP    1 603 276 A1    12/2005

OTHER PUBLICATIONS

International Search Report and Written Opinion issued Apr. 25, 2013 in PCT/IB2012/002734.

* cited by examiner

*Primary Examiner* — John Blanton

(57) ABSTRACT

Methods and systems for determining time delays of networks are disclosed. For example, a method for determining a time delay of a network having i) a transmitting node and ii) a receiving node, wherein each of the transmitting node and the receiving node comprises a Data Link Layer (DLL), a management layer, and a Physical Layer (PHY) is disclosed. The method includes determining a time that the first packet was received by the transmitting node, forwarding the time that the first packet was received to the management layer of the transmitting node; forwarding information in the first packet to the transmitting node; and determining the time delay of the network by subtracting the time the time that the first packet was received by the DLL of the transmitting node from a transmit time provided via the management layer of the receiving node.

21 Claims, 3 Drawing Sheets

SERVICES, SYSTEMS AND METHODS FOR PRECISELY ESTIMATING A DELAY WITHIN A NETWORK

CROSS REFERENCE TO RELATED APPLICATIONS

This disclosure claims the benefit of U.S. Provisional Application No. 61/554,884 filed on Nov. 2, 2011, which is incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The G.hn protocol (or standard) is a specification for networking over mediums, such as telephone wiring, power lines, coaxial cable and plastic optical fiber (POF). Various benefits of the G.hn standard include lower equipment costs, lower development costs, increased performance and ease of installation. Further, as the communication underlying technologies mature, increasing numbers of devices, such as computers, televisions and set-top boxes, are equipped with G.hn interfaces. However, as various different types of new services are provided over G.hn networks, adaptations of G.hn interfaces may be desirable to enable the new services or improve performance.

SUMMARY

Various aspects and embodiments of the invention are described in further detail below.

In an embodiment, a method for determining a time delay of a network having i) a transmitting node and ii) a receiving node, wherein each of the transmitting node and the receiving node comprises a Data Link Layer (DLL), a management layer, and a Physical Layer (PHY) is disclosed. The method includes in response to the DLL of the transmitting node receiving a first packet of information from a data source; determining a time that the first packet was received by the DLL of the transmitting node, forwarding the time that the first packet was received by the DLL of the transmitting node to the management layer of the transmitting node; forwarding information in the first packet to the PHY of the transmitting node; sending the information in the first packet to the receiving node using the PHY of the transmitting node; and determining, using circuitry, the time delay of the network by subtracting the time the time that the first packet was received by the DLL of the transmitting node from a transmit time provided via the management layer of the receiving node, the transmit time being a point in time that the information of the first packet is ready to be transmitted to a data sink by the receiving node.

In another embodiment, a method for determining a time delay of a network having i) a transmitting node and ii) a receiving node, wherein each of the transmitting node and the receiving node comprises a Data Link Layer (DLL), a management layer, and a Physical Layer (PHY) is disclosed. The method includes in response to the DLL of the transmitting node receiving a first packet of information from a data source, forwarding the information to the DLL of the receiving node; determining a transmit time, the transmit time being a point in time where the information is ready to be transmitted to a data sink by the receiving node; forwarding the transmit time to a management layer of the receiving node; and determining, using circuitry, the time delay of the network by subtracting a receive time from the transmit time, the receive time being provided via a management layer of the transmitting node, the receive time being a point in time that a first packet containing the information is received by the transmitting node.

In yet another embodiment, an apparatus for determining a time delay of a network includes a transmitting node containing circuitry, the transmit node including: a first Physical Layer (PHY), a management layer, and a first Data Link Layer (DLL) configured to receive a first packet of information from a data source, determining a receive time of the first packet by the DLL, forwarding the receive time to the first management layer, and forward information in the first packet to the first PHY, and circuitry configured to determine the time delay of the network by subtracting the receive time from a transmit time provided via a second management layer of a receiving node, the transmit time being a point in time that the information of the first packet is ready to be transmitted to a data sink by the receiving node.

In still another embodiment, an apparatus for determining a time delay of a network includes a receiving node containing circuitry, the receiving node including a management layer, a Physical Layer (PHY) configured to receive information provided by a data source via a transmitting node of the network, and a Data Link Layer (DLL) configured to receive the information from the PHY, determine a transmit time, the transmit time being a point in time where the information is ready to be transmitted to a data sink, and forward the transmit time to the management layer, and circuitry configured to determine the time delay of the network by subtracting a receive time from the transmit time, the receive time being provided via a management layer of the transmitting node, the receive time being a point in time that a first packet containing the information is received by the transmitting node.

BRIEF DESCRIPTION OF THE DRAWINGS

Various embodiments of this disclosure that are proposed as examples will be described in detail with reference to the following figures, wherein like numerals reference like elements.

DETAILED DESCRIPTION

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

The term "G.hn" is a name commonly used for a family of standards developed under the International Telecommunications Union's Telecommunication Standardization sector (commonly known as the "ITU-T"). The G.hn standard is promoted by a number of organizations that offer devices usable over power lines, phone lines and/or coaxial cables, such as the HomeGrid Alliance (www.HomeGrid.com). The majority of devices in which G.hn may become embedded, such as televisions, set-top boxes, residential gateways, personal computers or network-attached storage devices, are likely AC-powered and will be good candidates for Home-Grid technology.

An issue to consider when speaking of networks is the use of Audio-Visual (AV) data, which tends to consume massive amounts of bandwidth. In order to address the increased bandwidth issues, the IEEE 802.1 standards are being promulgated so as to improve the synchronization of devices and Quality of Service issues that arise. For example, IEEE p802.1AS is undergoing development to provide accurate time synchronization based on the IEEE 1588-2008 standard, enable network-attached audio devices to capture and/or render audio simultaneously, and quickly generate a media clock on one end of a Local Area Network (LAN) that is accurately synchronized to a clock on the other end of the LAN.

Figure 1:
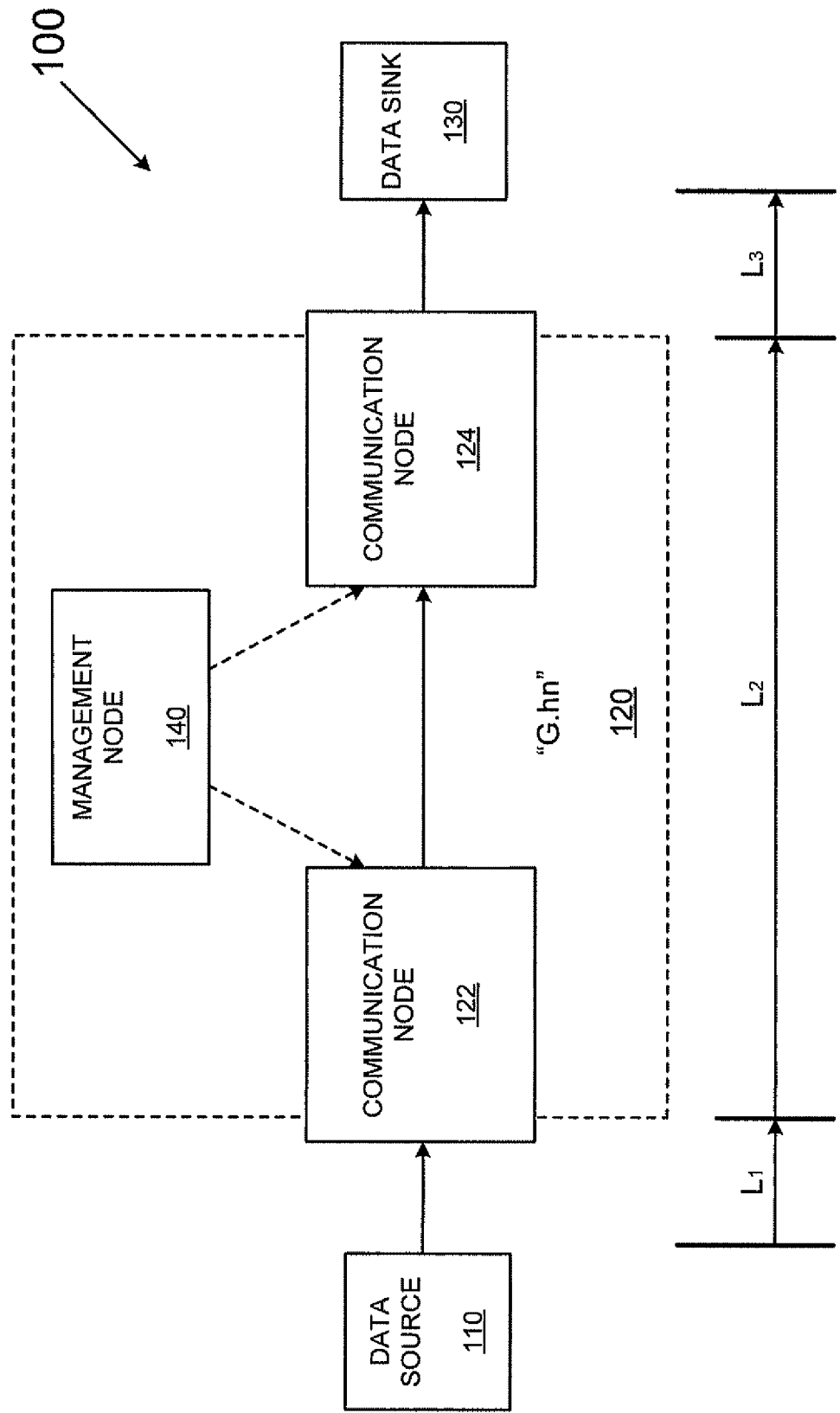
FIG. 1 is an example communication system using a G.hn network.

FIG. 1 is an example communication system 100 usable to precisely synchronize multiple clocks. The communication system 100 includes a data source 110, a G.hn network 120, and a data sink 130. The example G.hn network 120 includes a first communication node 122 and a second communication node 124 that are both configured to enable clocks across the G.hn network 120 to be precisely synchronized based upon various delays $L_1$, $L_2$ and $L_3$, inherent in the communication system with delay $L_2$ being the inherent delay of the G.hn network 120.

A management node 140 is optionally provided to monitor performance and manage overall performance and access to data noting that the management node 140 may be incorporated into either the first communication node 122 or the second communication node 124 as may be necessary or convenient.

While a G.hn network is used for the following example, the methods and systems of the present disclosure may be adapted to any communications technology that uses a layered OSI (Open Systems Interconnection) model.

Further, while the example data source 110 is an audio-visual data source, e.g., a server containing a library of music and movies, the example data source 110 can be any device capable of providing any form of data to a network. Similarly, the data sink 130 can be any device capable of receiving and using any form of data.

Figure 2:
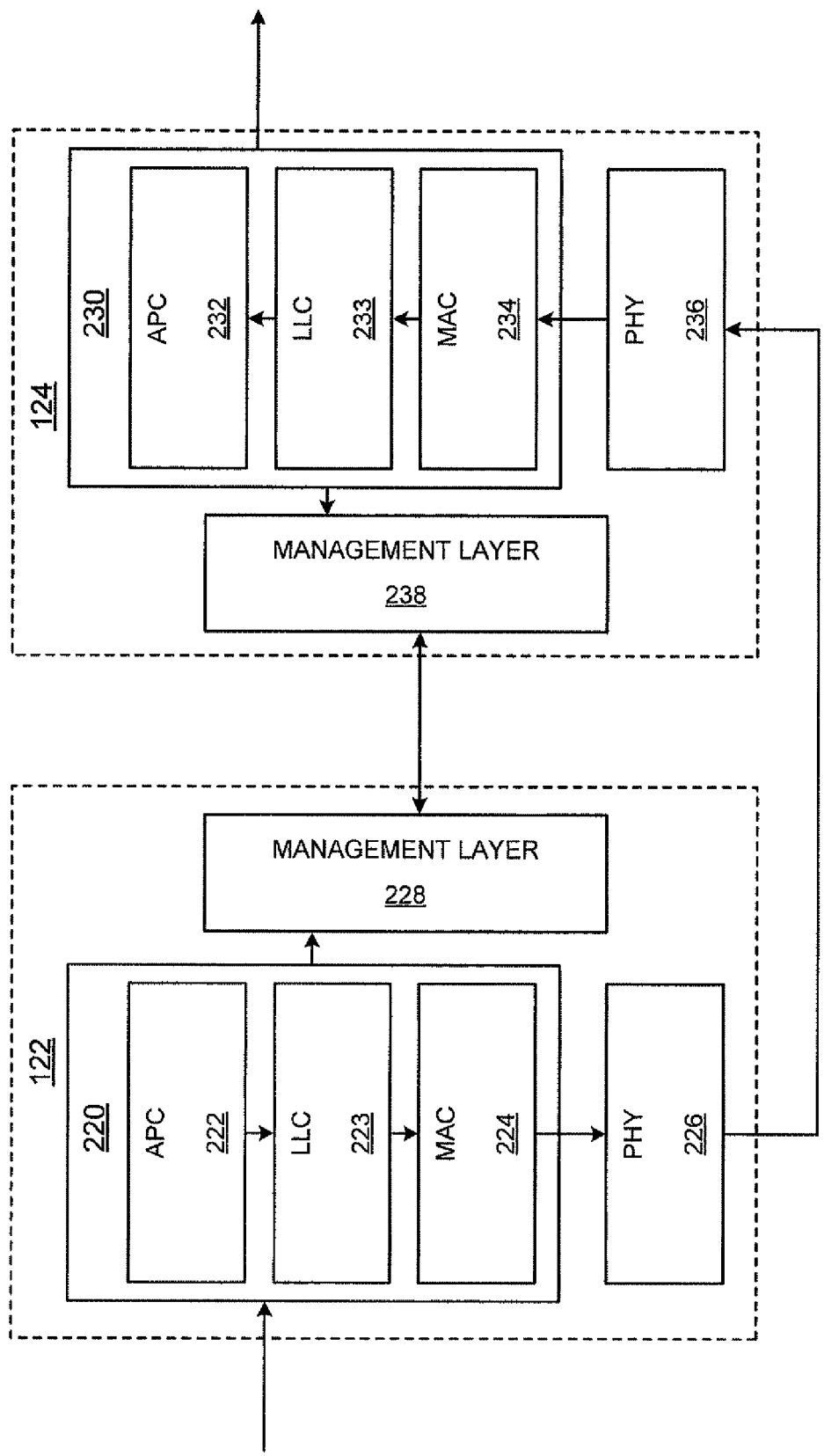
FIG. 2 depicts details of the two network nodes of FIG. 1 useful for determining delays in the G.hn network.

FIG. 2 depicts details of the two network nodes {122, 124} of FIG. 1 useful for determining delays in the G.hn network.

Node 122, hereinafter referred to as "the transmitting node 122," is used to receive data from an external source and efficiently transmit the data and other signals to node 124, which is hereinafter referred to as "the receiving node 124."

The transmitting node 122 includes a first Data Link Layer (DLL) 220, a first Physical Layer (PHY) 226 and a first management layer 228. The first DLL 220 includes a first Applications Protocol Convergence (APC) layer 222, a first logical Link Control (LLC) 223, and a first Medium Access Control (MAC) 224.

Similarly, the receiving node 124 includes a second DLL 230, a second PHY 236 and a second management layer 238. The second DLL 220 includes a second APC 232, a second LLC 233 and a second MAC 234.

In operation, in order to synchronize clocks (not shown) across a network, the first DLL 220 receives a packet of information. In the present example for G.hn networks, special synchronization ("sync") packets and follow-up packets can be used to synchronize clocks. However, in varying embodiments, the type of packet usable for the process of synchronization can vary widely.

The point in time that the first DLL 220 receives this packet of information shall be defined as "the receive time," which provides a first point in time to measure overall network delay, i.e., delay that includes processing time by the transmitting and receiving nodes {122, 124} as well as the time necessary for data to propagate across a given network, noting that there may be intermediate communication nodes between the transmitting and receiving nodes {122, 124} that may be necessary or useful to provide adequate performance. For the present example, the receive time is determined by the first LLC 223. However, in varying embodiments this function may be incorporated into the MAC 224, the APC 222, a layer above the first DLL 220, or another device added to the first DLL 220.

Once determined, the receive time is passed to the first management layer 228, which can be in communication with the second management layer 238 or with a management layer of another communication node, such as the management node 140 discussed with respect to FIG. 1. Communication between management nodes can be accomplished by one management node commanding a DLL and PHY to create and send one or more packets containing the information of interest.

The information of the received packet can then be extracted and reformatted to another packet protocol by the first DLL 220, and forwarded to the first PHY 226.

In turn, the first PHY 226 transmits the information to the second PHY 236, which then forwards the information to the second DLL 230.

The second DLL 230 then extracts the information, and reformats the information to a form suitable to a desired data sink, e.g., an Ethernet-capable set-top box controlling a television. At the point in time when the second DLL 230 determines that it is ready to transmit the information to the appropriate external device, the second DLL 230 marks that point in time as "the transmit time," and provides the transmit time to the second management layer 238.

Afterward, one or both of the communication nodes {122, 124} can determine the overall time delay of the network by subtracting a receive time from the transmit time, again noting that such calculations may be done by a separate management node. Clocks in the individual communication nodes {122, 124} may then be precisely synchronized taking into account the network delay(s).

For the present example, synchronization is accomplished using a "follow up" message. That is, under control of a management layer, the timing/delay information (calculated using the synchronization packet(s)) is incorporated to one or more follow-up packets and distributed using the various DLLs and PHYs of a network in order to distribute timing information to other AVB bridges.

Figure 3:
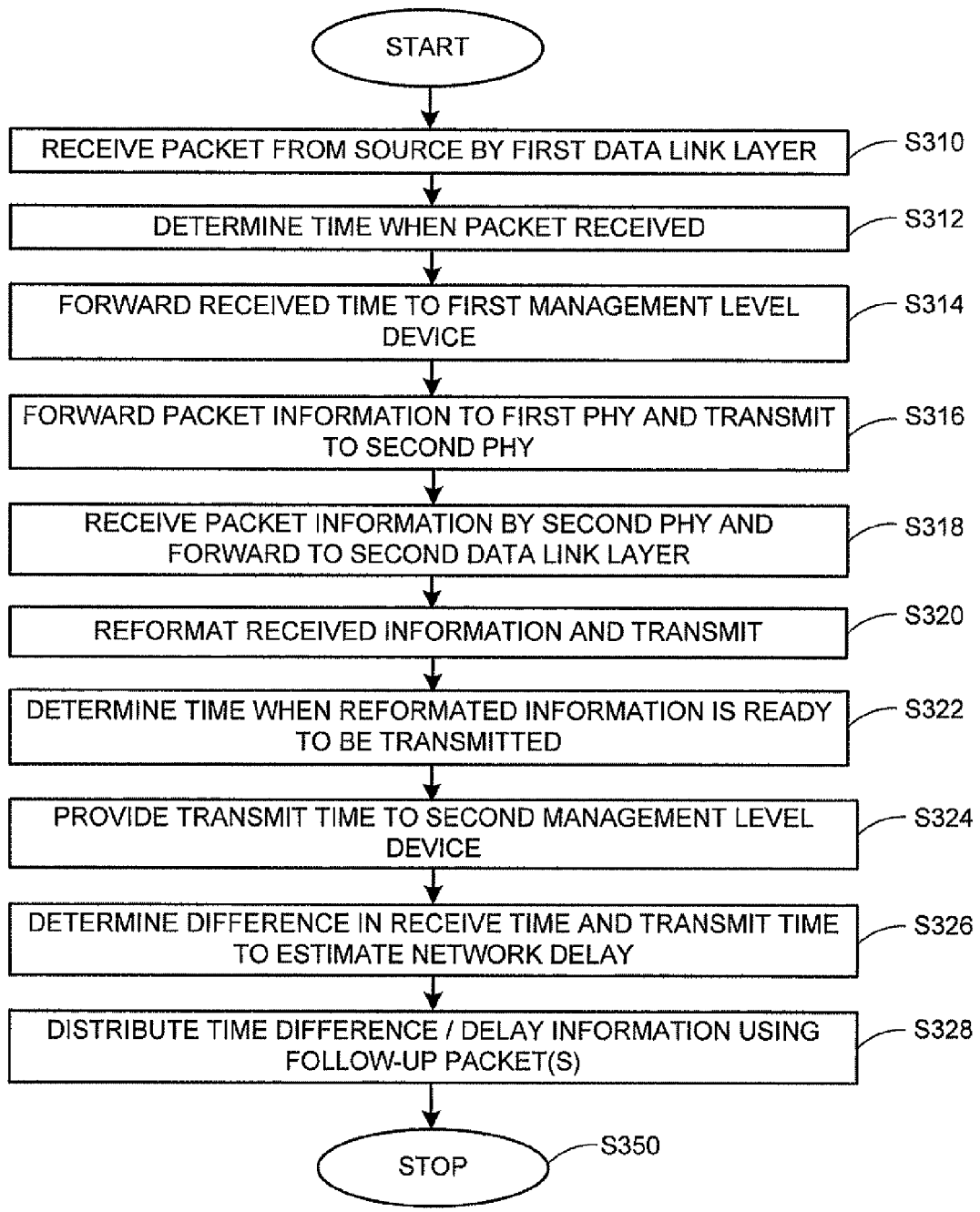
FIG. 3 is a flowchart outlining an operation of the disclosed methods and systems for determining delays in a G.hn network.

FIG. 3 is a flowchart 300 outlining an operation of the disclosed methods and systems for determining delays in a network (e.g., a G.hn network). While the below-described steps are described as occurring in a particular sequence for convenience, the order of various operations may be changed from embodiment to embodiment, and the operations may occur simultaneously or may be made to occur in an overlapping fashion. The process starts at step S310 where a packet is received from a data source by a first DLL of a first/transmitting communication node. Next, at step S312, the "receive time" is determined by the first DLL, and at step S314, the receive time is provided to a first management layer of the first/transmitting communication node.

At step S316, the information of the received packet is forwarded to a PHY of the first/transmitting communication node, and from there the information is transmitted to a PHY of a second/receiving communication node. Next, at step S318, the information is received by the second PHY and forwarded to a second DLL of the second/receiving communication node. Then, at step S320, the second DLL reformats the information to a desired form and transmits the information to an external device.

At step S322, the second DLL determines the transmit time, i.e., the point in time at which the second DLL is ready to transmit the information, and at step S324 the transmit time is provided to a management layer of the second/receiving communication node. Then, at step S326, the receive time of step S312 and the transmit time of step S324 are used to determine the network delay. As mentioned above, this can be accomplished by a managing entity, e.g., a management layer of a receive node, creating packets of information, and distributing transmit and/or receive times to one or more other nodes.

At step S328, delay/timing information is distributed to one or more other nodes using one or more follow-up packets so as to establish synchronization of clocks.

The techniques and devices described herein may be implemented by various means. For example, the disclosed techniques may be implemented in hardware, software, or a combination thereof. For a hardware implementation, the various devices performing various processes within one or more application specific integrated circuits (ASICs), digital signal processors (DSPs), programmable logic, field programmable gate arrays (FPGAs), processors, controllers, micro-controllers, microprocessors, other electronic units designed to perform the functions described herein, or a combination thereof.

In various software implementations, the techniques described herein may be implemented with modules (e.g., procedures, functions, and so on) that perform the functions described herein. One or more forms of software code may be stored in one or more memory units and executed by one or more processors. Memory units may be implemented within a processor or external to the processor, in which case such memory units can be communicatively coupled to the processor via various means.

While the invention has been described in conjunction with specific embodiments that are proposed as examples, such embodiments are intended to be illustrative, and not limiting. Accordingly, alternatives, modifications, and variations may be made and/or performed to the embodiments without departing from the scope of the claims.

What is claimed is:

1. A method for determining a time delay of a network having i) a transmitting node and ii) a receiving node, wherein each of the transmitting node and the receiving node comprises a Data Link Layer (DLL), a management layer, and a Physical Layer (PHY), the method comprising:
   in response to the DLL of the transmitting node receiving a first packet of information from a data source,
   determining a time that the first packet was received by a layer above a Medium Access Control (MAC) layer of the DLL of the transmitting node;
   forwarding the time that the first packet was received by the DLL of the transmitting node to the management layer of the transmitting node;
   forwarding information in the first packet to the PHY of the transmitting node;
   sending the information in the first packet to the receiving node using the PHY of the transmitting node; and
   determining, using circuitry, the time delay of the network by subtracting the time the time that the first packet was received by the DLL of the transmitting node from a transmit time provided via the management layer of the receiving node, the transmit time being a point in time that the information of the first packet is ready to be transmitted to a data sink by the receiving node.

2. The method of claim 1, further comprising, in response to the PHY of the receiving node receiving the information of the first packet:
   forwarding the information of the first packet to the DLL of the receiving node by the second PHY; and
   determining the point in time when the information of the first packet is ready to be transmitted to a data sink by the receiving node.

3. The method of claim 2, further comprising distributing the time delay of the network to one or more nodes using one or more follow-up packets.

4. The method of claim 1, wherein the network is a local area network using a physical medium of at least one of a power line, a telephone line, a coaxial cable and a plastic optical fiber.

5. The method of claim 1, wherein the first packet is a synchronization packet usable to provide synchronization of a clock at each of the transmitting node and the receiving node.

6. The method of claim 5, further comprising further comprising distributing the time delay of the network to one or more nodes using one or more follow-up packets.

7. A method for determining a time delay of a network having i) a transmitting node and ii) a receiving node, wherein each of the transmitting node and the receiving node comprises a Data Link Layer (DLL), a management layer, and a Physical Layer (PHY), the method comprising: in response to the DLL of the transmitting node receiving a first packet of information from a data source, forwarding the information to the DLL of the receiving node; determining a transmit time, the transmit time being a point in time where the information is ready to be transmitted to a data sink by the receiving node; forwarding the transmit time to a management layer of the receiving node; and determining, using circuitry, the time delay of the network by subtracting a receive time from the transmit time, the receive time being provided via a management layer of the transmitting node, the receive time being a point in time that a first packet containing the information is received by the transmitting node, wherein determining the receive time is performed by a layer above a Medium Access Control (MAC) layer of a DLL of the transmitting node.

8. The method of claim 7, wherein the network is a local area network using a physical medium of at least one of a power line, a telephone line, a coaxial cable and a plastic optical fiber.

9. The method of claim 7, wherein the first packet is a synchronization packet usable to provide synchronization of a clock at each of the transmitting node and the receiving node.

10. The method of claim 7, further comprising distributing the time delay of the network to one or more nodes using one or more follow-up packets.

11. An apparatus for determining a time delay of a network, comprising:
   a transmitting node containing circuitry, comprising:
      a first Physical Layer (PHY);
      a management layer; and a first Data Link Layer (DLL) configured to receive a first packet of information from a data source, determining a receive time of the first packet by a layer above a Medium Access Control (MAC) layer of the DLL, forwarding the receive time to the first management layer, and forward information in the first packet to the first PHY; and circuitry configured to determine the time delay of the network by subtracting the receive time from a transmit time provided via a second management layer of a receiving node, the transmit time being a point in time that the information of the first packet is ready to be transmitted to a data sink by the receiving node.

12. The apparatus of claim 11, wherein the receiving node further comprises:

a second PHY; and a second DLL configured to receive the information from the second PHY, determine the transmit time, and forward the transmit time to the second management layer.

13. The apparatus of claim 11, wherein the network is a local area network using a physical medium of at least one of a power line, a telephone line, a coaxial cable and a plastic optical fiber.

14. The apparatus of claim 13, wherein the first packet is a synchronization packet usable to provide synchronization of a clock at each of the transmitting node and the receiving node.

15. The apparatus of claim 14, further comprising a management node, the management node containing the circuitry configured to determine the time delay of the network.

16. The apparatus of claim 14, further comprising circuitry configured to distribute the time delay of the network to one or more other nodes using one or more follow-up packets.

17. The apparatus of claim 14, further comprising circuitry configured to distribute the time delay of the network to one or more other nodes using one or more follow-up packets.

18. An apparatus for determining a time delay of a network, comprising:

a receiving node containing circuitry, including:

a management layer;

a Physical Layer (PHY) configured to receive information provided by a data source via a transmitting node of the network; and a Data Link Layer (DLL) configured to receive the information from the PHY, determine a receive time by a layer above a Medium Access Control (MAC) layer of the DLL, determine a transmit time, the transmit time being a point in time where the information is ready to be transmitted to a data sink, and forward the transmit time to the management layer; and circuitry configured to determine the time delay of the network by subtracting the receive time from the transmit time, the receive time being provided via a management layer of the transmitting node, the receive time being a point in time that a first packet containing the information is received by the transmitting node.

19. The apparatus of claim 18, wherein the network is a local area network using a physical medium of at least one of a power line, a telephone line, a coaxial cable and a plastic optical fiber.

20. The apparatus of claim 19, wherein the first packet is a synchronization packet usable to provide synchronization of a clock at each of the transmitting node and the receiving node.

21. The apparatus of claim 18, further comprising a management node, the management node containing the circuitry configured to determine the time delay of the network.

* * * * *